United States Patent [19]

Lauria

[11] Patent Number: 5,462,082
[45] Date of Patent: Oct. 31, 1995

[54] BACKFLOW PREVENTER WITH FAILURE INDICATOR

[76] Inventor: Thomas J. Lauria, 398 Mayer Ct., Ridgefield, N.J. 07657

[21] Appl. No.: 319,978

[22] Filed: Oct. 7, 1994

[51] Int. Cl.⁶ .................................................. F16K 15/18
[52] U.S. Cl. ........................ 137/557; 137/614.19; 251/82
[58] Field of Search ................ 251/82; 137/557, 137/312, 614.19

[56] References Cited

U.S. PATENT DOCUMENTS

| | | | |
|---|---|---|---|
| 2,587,960 | 8/1952 | Bletcher et al. | 277/61 |
| 2,587,961 | 8/1952 | Bletcher et al. | 277/61 |
| 3,376,884 | 4/1968 | Bucknell et al. | 137/119 |
| 3,835,878 | 9/1974 | Braidt et al. | 137/557 X |
| 4,071,045 | 4/1978 | Brandt | 137/528 |
| 4,395,018 | 7/1983 | Moen | 251/310 |
| 4,706,705 | 6/1987 | Lee | 137/514.5 |
| 4,804,017 | 2/1989 | Knapp | 251/82 X |
| 5,067,520 | 11/1991 | Kremer et al. | 251/82 X |
| 5,148,828 | 9/1992 | Farnham | 137/454.6 |
| 5,195,552 | 3/1993 | Nehm | 137/269 |
| 5,203,872 | 4/1993 | Naffziger | 251/82 |

OTHER PUBLICATIONS

Nupro "50" Series Lift Check Valve (Aug., 1990) N–189–3 1 page.
Metraflex "Silent Check Valves" (catalog page from Mechanical Products Catalog–1990) 1 page.

*Primary Examiner*—John C. Fox

[57] ABSTRACT

A backflow prevention device with a failure indicator designed to determine the functional state of integral backflow prevention device(s) or check valve(s). Check valve(s) are assembled in combination with failure indicator(s) and valve(s) or flow regulation device(s), and is designed to allow a working fluid to flow in the desired direction of fluid flow and prevent backflow. A built in test or procedure enables the functional condition of backflow prevention device(s) or check valve(s) to be determined readily, easily, and reliably.

8 Claims, 2 Drawing Sheets

BACKFLOW PREVENTER WITH FAILURE INDICATOR

BACKGROUND—FIELD OF INVENTION

This invention relates to backflow prevention, which deals specifically with preventing fluid flow in an undesired direction.

BACKGROUND—DESCRIPTION OF PRIOR ART

Backflow preventers are devices which are designed to allow a working fluid or fluid to pass through in the desired direction of fluid flow; they are designed to prevent backflow: fluid flow in an undesired or reverse direction. Two conditions which tend to drive fluid flow in the reverse direction include backpressure and backsiphonage. Backpressure is the condition by which fluid pressure increases downstream of the device. Backsiphonage is the condition that occurs when the fluid's supply pressure drops. For example, backsiphonage may occur when a water main breaks; there is a large draw on a water main such as when fire fighters are pumping water to extinguish a fire; a fluid pump falls in a building; a water closet is flushed; etc. Flow in a reverse direction is often not desired since it may involve contamination of the fluid's source with foreign elements or contaminants.

There are a wide variety of devices which deal with preventing backflow from occurring. A simple device called a check valve is often used to prevent backflow. Such a device often includes a moveable member made of rubber, metal, or other material which seats against a fixed member when a backflow-causing condition occurs. Ideally this seal prevents backflow. A variety of check valves exist. For example, U.S. Pat. No. 4,706,705 to Lee (1987) is a spring-loaded version. Other versions include U.S. Pat. No. 4,071,045 to Brandt (1978). U.S. Pat. No. 3,376,884 to Bucknell and Ward (1968) is an example of a check valve/fluid flow diverter combination. Fluid flow regulation devices or valves include, for example, U.S. Pat. No. 4,395,018 to Moen (1983). Practically, however, a backflow preventer's seating member(s) often deteriorates or otherwise becomes fouled or functionally impaired with normal usage. Thus, if functionally impaired, a check valve will not prevent backflow from occurring. Furthermore, whether or not the check valve is functionally able to prevent backflow often remains unknown.

To offer additional protection against backflow, two check valves in tandem, called a double check valve, are often used. However, double check valves are of little more value than lone or single check valves; if operating conditions cause one check valve to become functionally impaired, they will likely have the same effect on the second check valve.

A third type of backflow preventer is the reduced pressure zone assembly. Reduced pressure zone backflow preventers often consist of a pressure differential relief valve located between two check valves. Reduced pressure zone backflow preventers are complicated devices which can only be functionally tested using a separate test kit, and a complex test procedure. Generally, a certified expert in testing backflow preventers is required to perform a detailed functionality test on the reduced pressure zone backflow preventer. A further disadvantage of reduced pressure zone backflow preventers is that the test kit's gage or gages often require frequent calibration to ensure accuracy of the test's measurements. Similar to that of the reduced pressure zone test is that for the double check valve, previously mentioned.

Vacuum breakers, or vents to the atmosphere, attempt to prevent backflow by opening a passage or vent to the atmosphere under the backflow-causing condition of backsiphonage. When backsiphonage occurs, a vacuum breaker often attempts to allow atmospheric pressure air to be drawn into the working fluid's supply line, rather than drawing fluid or contaminant. However, the air ports of such devices can often become clogged, causing restriction. This leads to a deterioration of their intended abilities leaving little, if any, residual benefit. In addition, the working parts of a vacuum breaker often deteriorate with normal use and the device can become functionally impaired or otherwise fouled. Accordingly, such a device will not accomplish its desired function of preventing backflow.

Some backflow preventers may be comprised of combinations of the above described devices. A dual check valve assembly with an integral vacuum breaker is one such example. However, this redundancy accomplishes little additional protection against backflow in light of their individual flaws. None of the methods of dealing with backflow prevention described offers a viable solution to the problem of backflow prevention.

One problem that backflow preventers attempt to deal with is that if backflow occurs, contamination of the fluid's source may result. In the case of the public drinking water supply, contamination with chemicals has in fact led to mass illness, and even death. Instances can be cited where backsiphonage has let to ingestion of lethal chemicals by unknowingly drinking from a contaminated drinking water supply. This example merely highlights the need for, and seriousness, of adequate backflow protection. Therefore, it is imperative that the functional state of a backflow preventer be determined simply, easily and reliably. A device with a built-in test provides a degree of assurance that backflow will be prevented. Such a device represents a substantial milestone in the field of backflow prevention. One or more shortcomings of the prior art will become apparent from a consideration of the drawings and ensuing descriptions.

DESCRIPTIONS OF DRAWINGS

SUMMARY

One version of Backflow Preventer with Failure Indicator is comprised of fluid flow regulation valve, check valve, and mechanism to apply test pressure to check valve. Backflow Preventer with Failure Indicator can take many forms.

DESCRIPTION AND OPERATION OF FIGURES

The reader is asked to take note that part of the following descriptions are of fluid flow regulation devices or valves, and check valves, common members of the prior art. Accordingly, the scope of my invention should not be determined by the embodiments illustrated, but by the appended claims and their legal equivalents.

FIG. 1—Description

Figure 1:
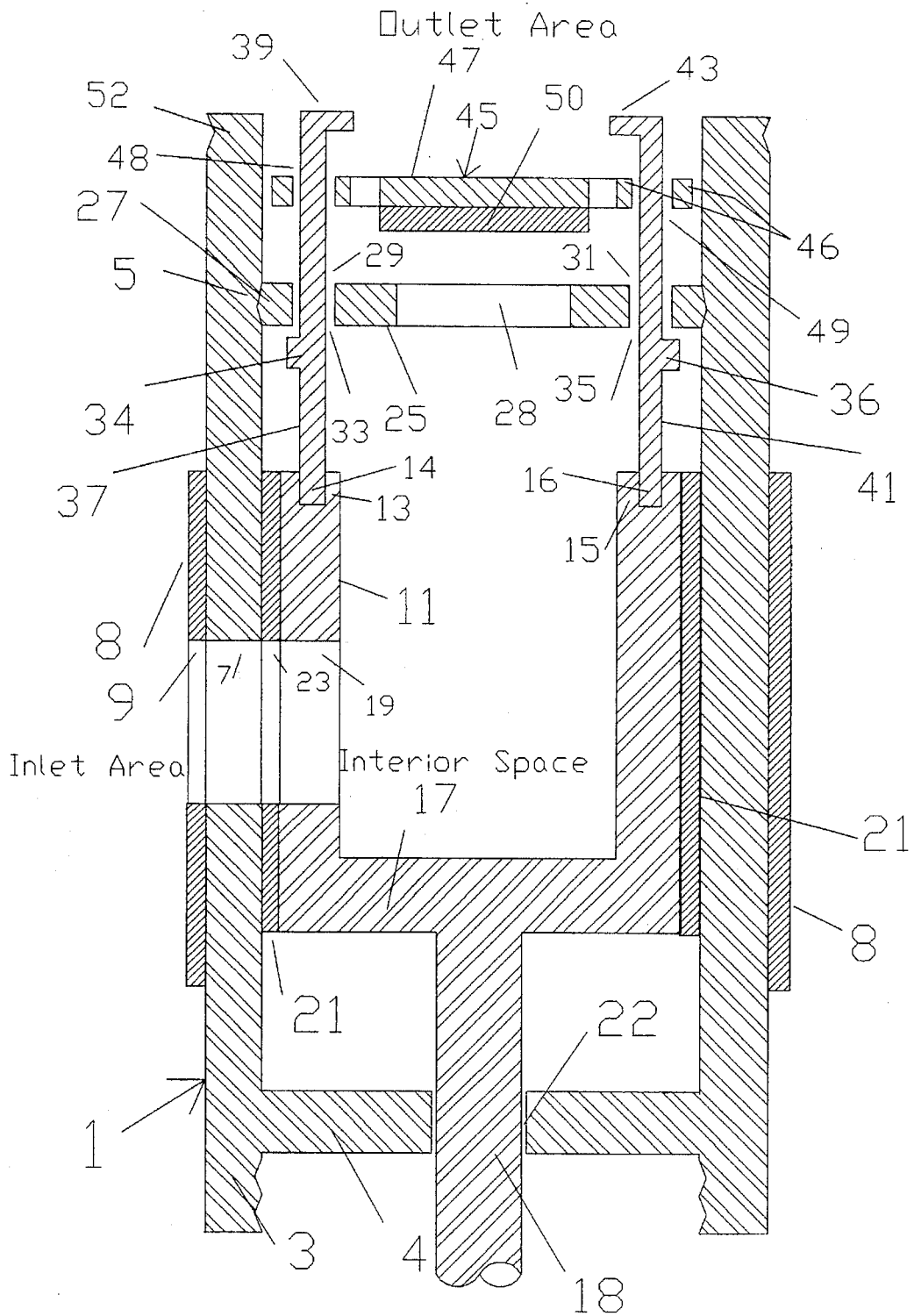
FIG. 1 shows a cutaway side view of a single check valve version of my backflow preventer with failure indicator with a mechanical hold-down check valve indicator mechanism.

A backflow preventer with failure indicator determines when failure of backflow preventer's functional capability occurs. FIG. 1 shows a cutaway side view of a single check valve version of my backflow preventer with failure indicator; it has chamber, fluid flow regulation valve, and a mechanical hold-down check valve indicator mechanism. A cylindrical tube 1 constructed of stainless steel has a female normal pipe thread 3 on one end and a female normal pipe thread 5 on interior cylinder wall. Cylindrical tube 1 has a welded and sealed integral circular bottom plate, bottom plate, or stopper 4 constructed of stainless steel. Cylindrical tube 1 has a circular hole passage or passage 7 which passes perpendicularly through one cylinder wall toward cylindrical tube 1's center line. Cylindrical tube 1 has a cylindrical rubber sleeve or sleeve 8 fitted and sealed around an exterior portion of itself. Cylindrical tube 1 represents a substantially cylindrical enclosure. Sleeve 8 has a circular hole passage or passage 9 which passes perpendicularly through sleeve 8 toward cylindrical tube 1's center line. Passage 9 and passage 7 are in line with each other. A cylindrical tube or tube 11 constructed of stainless steel has a female bolt thread or thread 13 on one side and a female bolt thread or thread 15 on its other. Tube 11 has a stainless steel circular plate or plate 17 welded and sealed to its base. Tube 11 has a circular hole passage or passage 19 which passes perpendicularly through tube 11 toward tube 11's center line. Tube 11 has a cylindrical rubber sleeve or sleeve 21 fitted and sealed around an exterior portion of itself. Sleeve 21 has a circular hole passage 23 which passes perpendicularly through sleeve 21 toward tube 11's center line. A circular check valve sealing base or base 25 constructed of stainless steel has a male normal pipe thread or thread 27 on its outer perimeter. Base 25 has a circular hole or hole 29 and a circular hole or hole 31 passing through it. Hole 29 and hole 31 are coated with a rubber sealant 33 and a rubber sealant 35, respectively. Base 25 has a center hole 28. A solid stainless steel cylinder 37 has a male bolt thread or thread 14 on one end by which it joins to female bolt thread 13. Solid stainless steel cylinder 37 has a welded knob, knob, or stopper 39 extending perpendicular to longitudinal axis of solid stainless steel cylinder 37. A stainless steel stopper or stopper 34 extending perpendicular to longitudinal axis of solid stainless steel cylinder 37 is welded integrally to solid stainless steel cylinder 37. A solid stainless steel cylinder 41 has a male bolt thread or thread 16 on one end by which it joins to female bolt thread 15. Solid stainless steel cylinder 41 has a welded knob, knob, or stopper 43 extending perpendicular to longitudinal axis of solid stainless steel cylinder 41. A stainless steel stopper or stopper 36 extending perpendicular to longitudinal axis of solid stainless steel cylinder 41 is welded integrally to solid stainless steel cylinder 41. A circular valve platform or platform 45 is constructed of solid stainless steel. Platform 45 is composed of an outer ring 46 and a circular inner plate 47. Outer ring 46 has a circular hole 48 and a circular hole 49 by which solid stainless steel cylinder 37 and solid stainless steel cylinder 41 pass through. Outer ring 46 and circular inner plate 47 are joined by three equidistant prongs (not shown). The outer radius of circular inner plate 47 is less than the inner radius of outer ring 46. The outside radius of outer ring 46 is less than the inside radius of cylindrical tube 1. A solid rubber check valve or check valve 50 has an outer radius equal to the outer radius of circular inner plate 47 but greater than center hole 28 of base 25. Check valve 50 is fitted and sealed to circular inner plate 47. Cylindrical tube 1 has a male normal pipe thread 52 on one end. Plate 17 has a solid stainless steel cylinder, fluid flow control, handle, or cylinder 18 welded and sealed to its center. Diameter of cylinder 18 is less than that of plate 17. Cylinder 18 passes through a circular hole or hole 22 in stopper 4. Diameter of hole 22 is greater than that of cylinder 18. Cylinder 18 allows for full position control of tube 11, integral components, and related members. When tube 11 is in its uppermost position, stopper 34 and stopper 36 are in contact with base 25. When tube 11 is in its lowermost position, plate 17 contacts bottom plate 4 leaving a small gap between inlet area and interior space. Sufficient friction exists between rubber valving sealing surfaces and related members to allow for full vertical control of resultant fluid flow mechanism or valve when under pressure from fluid supply source at inlet area. Base 25 and cylindrical tube 1 are fully sealed, joined, and tightened together. One skilled in the art would clearly know how to appropriately seal, join, and tighten base 25 and cylindrical tube I and other members, as appropriate.

FIG. 1—Operation

FIG. 1 is shown with fluid flow regulation valve in uppermost or full-flow position. Cylindrical tube 1 is joined to a foundation (not shown) by female normal pipe thread 3 and male normal pipe thread 52. Cylindrical rubber sleeve 8 makes a seal between cylindrical tube 1 and contact areas of foundation. Sleeve 8 is positioned against an inlet fluid supply source at inlet area. Sleeve 21 makes a seal between tube 11 and cylindrical tube 1.

With fluid flow regulation valve in positions other than lowermost position (thereby indicating user desire for a corresponding degree of fluid flow between inlet area and outlet area), fluid is allowed to enter interior space from fluid supply source at inlet area. Fluid then passes through center hole 28. Platform 45 then rides up along solid stainless steel cylinder 37 and solid stainless steel cylinder 41, stopping when contact is made with stopper 39 and stopper 43. Fluid then passes through unsealed openings in platform 45; then exits or leaves through outlet area. Thus, under normal conditions, fluid may flow normally from inlet area to outlet area, as so desired. In uppermost or full-flow position, tube 11 is in its upwardmost position and stopper 34 and stopper 36 make contact with base 25. In the event of a backflow-causing condition, while fluid flow regulation valve is in a position other than its lowermost position, platform 45 will ride down along solid stainless steel cylinder 37 and solid stainless steel cylinder 41; allowing for check valve 50 to contact base 25. If the seal between check valve 50 and base 25 is good, backflow will be prevented. If the seal between check valve 50 and base 25 is not good or fouled, backflow will not be prevented.

With the fluid flow regulation device in its lowermost position (thereby indicating user desire for no fluid flow between inlet area and outlet area), tube 11 is lowered to its lowermost position. When tube 11 is in its lowermost position, plate 17 contacts bottom plate 4 allowing for a small gap or passage way between inlet area and interior space. When tube 11 is brought to its lowermost position, platform 45 is contacted by stopper 39 and stopper 43 such that platform 45 rides along solid stainless steel cylinder 37 and solid stainless steel cylinder 41, positioning check valve 50 in contact with base 25. With a small gap between inlet area and interior space, a degree of fluid pressure is applied to check valve 50 and base 25 thereby testing check valve 50's seal with base 25. If the seal between check valve 50 and base 25 is good, no fluid passes from interior space to outlet area. If the seal between check valve 50 and base 25 is bad or fouled, fluid passes from interior space to outlet area proportional to degree of fouling. Unit can be serviced, repaired, or replaced if found to be defective. In the event of a backflow-causing condition when fluid flow regulation device is in its lowermost position, check valve 50 is in contact with base 25. If the seal between check valve 50 and base 25 is good, backflow will be prevented. If the seal between check valve 50 and base 25 is bad or fouled, backflow will not be prevented.

FIG. 2—Description

Figure 2:
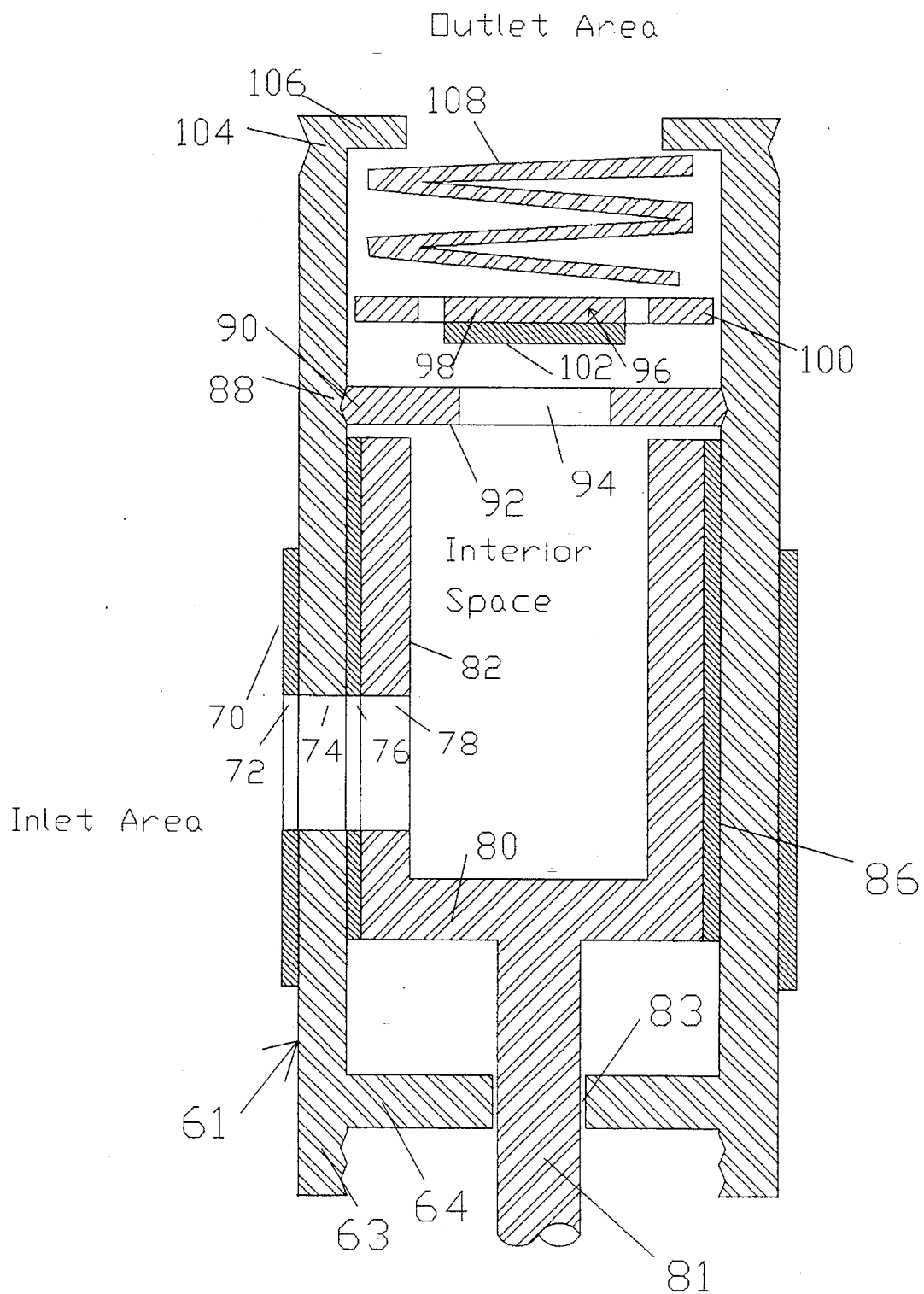
FIG. 2 shows a cutaway side view of a single check valve version of my backflow preventer with failure indicator with a spring-loaded check valve indicator mechanism.

FIG. 2 shows a cutaway side view of a single check valve version of my backflow preventer with failure indicator; it has chamber, fluid flow regulation valve, and a spring-loaded check valve indicator mechanism. A cylindrical tube 61 constructed of stainless steel has a female normal pipe thread 63 on one end and a female normal pipe thread 88 on interior cylinder wall. Cylindrical tube 61 has a welded and sealed integral circular bottom plate, bottom plate, or stopper 64 constructed of stainless steel. Cylindrical tube 61 has a circular hole passage or passage 74 which passes perpendicularly through one cylinder wall toward cylindrical tube 61's center line. Cylindrical tube 61 has a cylindrical rubber sleeve or sleeve 70 fitted and sealed around an exterior portion of itself. Cylindrical tube 61 represents a substantially cylindrical enclosure. Sleeve 70 has a circular hole passage or passage 72 which passes perpendicularly through sleeve 70 toward cylindrical tube 61's center line. Passage 72 and passage 74 are in line with each other. A cylindrical tube or tube 82 constructed of stainless steel has a stainless steel circular plate or plate 80 welded and sealed to its base. Tube 82 has a circular hole passage or passage 78 which passes perpendicularly through tube 82 toward tube 82's center line. Tube 82 has a cylindrical rubber sleeve or sleeve 86 fitted and sealed around an exterior portion of itself. Sleeve 86 has a circular hole passage or passage 76 which passes perpendicularly through sleeve 86 toward tube 82's center line. A circular check valve sealing base or base 92 constructed of stainless steel has a male normal pipe thread or thread 90 on its outer perimeter. Base 92 has a circular center hole or hole 94 passing through it.

A circular valve platform or platform 96 is constructed of solid stainless steel. Platform 96 is composed of an outer ring 100 and a circular inner plate 98. Outer ring 100 and circular inner plate 98 are joined by three equidistant prongs (not shown). The outer radius of circular inner plate 98 is less than the inner radius of outer ring 100. The outside radius of outer ring 100 is less than the inside radius of cylindrical tube 61. A solid rubber check valve or check valve 102 has an outer radius equal to the outside radius of circular inner plate 98 and is greater than the diameter of hole 94 of base 92. Check valve 102 is fitted and sealed to circular inner plate 98. Cylindrical tube 61 has an integral stainless steel ring, ring, or stopper 106 welded and sealed to it. A stainless steel helical compression spring or spring 108 is between stopper 106 and platform 96. Cylindrical tube 61 has a male normal pipe thread 104 on one end. Plate 80 has a solid stainless steel cylinder, fluid flow control, handle, or cylinder 81 welded and sealed to its center. Diameter of cylinder 81 is less than that of plate 80. Cylinder 81 passes through a circular hole or hole 83 in stopper 64. Diameter of hole 83 is greater than that of cylinder 81. Cylinder 81 allows for full position control of tube 82, integral components, and related members. When tube 82 is in its uppermost position, the top of tube 82 is in contact with base 92. When tube 82 is in its lowermost position, plate 80 contacts bottom plate 64 leaving a small gap between inlet area and interior space. Sufficient friction exists between rubber valving sealing surfaces and related members to allow for full vertical control of resultant fluid flow mechanism or valve when under pressure from fluid supply source at inlet area. When resultant fluid flow mechanism or valve is under pressure from fluid supply source at inlet area and tube 82 is in its lowermost position, spring 108 is such that check valve 102 is in contact with base 92. However, when resultant fluid flow mechanism or valve is under pressure from fluid supply source at inlet area and tube 82 is not significantly in its lowermost position, spring 108 is compressed due to increased fluid flow such that check valve 102 is not in contact with base 92. When there is no fluid pressure at inlet area, spring 108 is such that check valve 102 is in contact with base 92 regardless of the position of tube 82. Base 92 and cylindrical tube 61 are fully sealed, joined, and tightened together. One skilled in the art would clearly know how to appropriately seal, join, and tighten base 92 and cylindrical tube 61 and other members, as appropriate. The embodiment represented by FIG. 2 is a preferred embodiment.

FIG. 2—Operation

FIG. 2 is shown with fluid flow regulation valve in uppermost or full-flow position. Cylindrical tube 61 is joined to a foundation (not shown) by female normal pipe thread 63 and male normal pipe thread 104. Cylindrical rubber sleeve 70 makes a seal between cylindrical tube 61 and contact areas of foundation. Sleeve 70 is positioned against an inlet fluid supply source at inlet area. Sleeve 86 makes a seal between tube 82 and cylindrical tube 61. With fluid flow regulation valve in positions other than lowermost position (thereby indicating user desire for a corresponding degree of fluid flow between inlet area and outlet area), fluid is allowed to enter interior space from fluid supply source at inlet area. Fluid then passes through center hole 94. Platform 96 is pushed up; correspondingly compressing spring 108. Fluid then passes through openings in platform 96; then exits or leaves through outlet area. Thus, under normal conditions, fluid may flow normally from inlet area to outlet area, as so desired. In uppermost or full-flow position, tube 82 is in its uppermost position and makes contact with base 92. In the event of a backflow-causing condition while fluid flow regulation valve is in a position other than its lowermost position, platform 96 descends allowing for check valve 102 to contact base 92. If the seal between check valve 102 and base 92 is good, backflow will be prevented. If the seal between check valve 102 and base 92 is not good or fouled, backflow will not be prevented.

With the fluid flow regulation device in its lowermost position (thereby indicating user desire for no fluid flow between inlet area and outlet area), tube 82 is lowered to its lowermost position. When tube 82 is in its lowermost position, plate 80 contacts bottom plate 64 allowing for a small gap or passage way between inlet area and interior space. Spring 108 decompresses due to decreased fluid flow and pressure such that check valve 102 is placed in contact with base 92 forming a seal. With a small gap between inlet area and interior space, a degree of fluid pressure is applied to check valve 102 and base 92 thereby testing check valve 102's seal with base 92. If the seal between check valve 102 and base 92 is good, no fluid passes from interior space to outlet area. If the seal between check valve 102 and base 92 is bad or fouled, fluid passes from interior space to outlet area proportional to degree of fouling. Unit can be serviced, repaired, or replaced if found to be defective. In the event of a backflow-causing condition when fluid flow regulation device is in its lowermost position, check valve 102 is in contact with base 92 (assuming spring 108 is not dysfunctional and there are no other problems with unit). If the seal between check valve 102 and base 92 is good, backflow will be prevented. If the seal between check valve 102 and base 92 is bad or fouled, backflow will not be prevented.

CONCLUSIONS, RAMIFICATIONS AND SCOPE OF INVENTION

Thus, the reader will see that the backflow preventer with failure indicator provides a substantial improvement over current methods of dealing with backflow; it provides an integral, built-in indicator to help determine the functional condition of a backflow preventer. The simplicity involved in my invention, as illustrated by the example descriptions and operations previously discussed, is of great value; the functional state of the backflow preventer can be easily, and reliably, determined where often there was no reasonable mechanism to determine its functional state or more easily known where there often was a complex, impractical method to determine its functional state. Providing an integral, easy, and reliable test enables backflow preventers to be more readily and widely used. Thus, they help provide a greater level of overall assurance that backflow will be prevented.

Backflow preventers are used in a wide variety of uses including commercial, residential, and otherwise. They can range in size from miniature, for situations where there is a low flow rate or space limitations, to large designs, to accommodate substantial flow rates.

Their applications include use in schools, office buildings, laboratories, apartment buildings, hotels, restaurants, individual homes, medical and health care facilities, gymnasiums, industrial applications, emergency rinsers, sprays, hose stations, mixing units, cleaning stations, faucets, bidets, tubs, spas, shower sprays, washing machines, dishwashers, flushometers, urinals, mixing valves, valves, sprays, lawn and garden care sprays, hose bibs, drinking stations, food stations, bar faucets, chemical processing, petroleum processing, etc. Check valves are used for any multitude of fluids including incompressible fluids as well as compressible ones. It must be stressed how extensive the list of uses and applications actually is.

While my above descriptions contain many specificities, these should not be construed as limitations on the scope of the invention, but rather as an exemplification of some preferred embodiments thereof. Many other variations are possible. Applicant does not consider these versions important enough to show in drawings or describe in detail in the description. For example, other embodiments of backflow preventer with failure indicator include designs where check valve hold-down mechanisms, flexible hold-down members, hold-down linkages, gravity hold-down or weighted check valves, friction, pressure differential, those which use rotational motion or change rotational motion into translational motion, or any other physical embodiment(s) where unit(s) check valve(s), or backflow preventer(s) can be restrained, functionally modified, or result in changes to or diversions of fluid flow. For example, embodiments of backflow preventer with failure indicator include designs with diverter(s). Diverters function to direct or divert fluid flow between multiple outlet areas. Though there are many examples of diverters, a common example of a diverter combination is that resident in a kitchen faucet with both spout and hose spray. As hose can be left in fluid which has the potential to be drawn into fluid supply under backflow-causing conditions, faucet's flow regulation valve/diverter often includes a backflow preventer(s) or check valve(s) integrally or separate. Examples of other backflow prevention devices with failure indicators include those with lockout device(s) or which could terminate, restrict, or divert fluid flow; in any way allowing for indication of backflow preventer(s) or check valve(s) functional condition to be evidenced. A backflow prevention device with failure indicator which could terminate, restrict, divert fluid, or otherwise influence fluid flow, etceteras, can be considered a fluid flow restriction indicator device or fluid flow restriction indicator mechanism.

Other embodiments of backflow preventer with failure indicator include a self-contained version that does not require any working fluid to be discharged from the assembly. Also, a backflow preventer with failure indicator may incorporate other methods used to prevent backflow, such as air vents, vacuum breakers, or reduced pressure zone assemblies, or otherwise. They may also incorporate multiple or redundant backflow prevention devices or check valves in tandem or otherwise. Any multitude of backflow prevention devices can be used. They may use other types of flow regulating devices including globe valves, gate valves or otherwise. They may include any number of fluid flow regulation devices or valves including those with a plurality of inlet passages or otherwise. They may include other mechanical, electronic or electrical devices, including pneumatics, hydraulics, and solenoids or otherwise. They may also use different indicator(s) including mechanical, physical, electronic, or electric. Indicators can include needle-type pressure gage(s), or electronic pressure gage(s). They may use different types of indicators in one design. The test procedure can be automated fully, in part, or be on user demand only. Indicators can be audible, visual, data, alarm, etc. An example of an electric or electronic indicator can include buzzers, warning lights, automated system shut-down, or other indication(s). Any number of indicators or indicating mechanisms can be used.

Designs can include check valves or other backflow prevention devices which are designed to be readily removed, disassembled, serviced, accessed, or replaced.

Materials can vary widely; metals, polymers, ceramics, composites, etc., can often be substituted. Many parts described as of circular cross section can have other shapes such as oval, trapezoidal, triangular, etc. Chamber need not be substantially cylindrical. Any number of shapes and embodiments can represent chamber. Chamber and many parts need not be joined as described. For example, threaded connections could be joined by sweat or solder fittings, adhesives, etc. Multiple parts joined by welds could be joined in many fashions or manufactured integrally. Parts may be eliminated, reduced, consolidated, and/or integral to a simpler design for a variety of reasons including lower material cost, ease of manufacture, or ease of assembly. Colors, textures, etc. could likewise be altered with out significant consequence.

Applicant believes that the theories of operation inherent to Descriptions and Operations of figures are accurate. Accordingly, the scope of my invention should be determined not by the embodiments illustrated, but by the appended claims and their legal equivalents.

What is claimed is:

1. A means for testing a backflow prevention device comprising:

a) fluid flow path;

b) check valve means in said fluid flow path including means to disable the check valve function;

c) means which allows fluid pressure from an inlet area to an interior space to test said check valve means in said fluid flow path; and d) means for testing said check valve means, wherein said means which allows fluid pressure from an inlet area to an interior space to test check valve means is a valve, 2. The means for testing a backflow prevention device of claim 1 wherein said fluid flow path is a substantially cylindrical enclosure.

3. The means for testing a backflow prevention device of claim 1 wherein said check valve means is a spring loaded check valve.

4. The means for testing a backflow prevention device of claim 1 is a means for detecting fluid pressure downstream of said means which allows fluid pressure from an inlet area to an interior space.

5. A backflow prevention device comprising:
   a) fluid flow path;
   b) check valve means in said fluid flow path including means to disable the check valve function;
   c) means which allows fluid pressure from an inlet area to an interior space to test said check valve means in said fluid flow path; and
   d) means for testing said check valve means, wherein said means which allows fluid pressure from an inlet area to an interior space to test check valve means is a valve.

6. The means for testing a backflow prevention device of claim 5 wherein said fluid flow path is a substantially cylindrical enclosure.

7. The means for testing a backflow prevention device of claim 5 wherein said check valve means is a spring loaded check valve.

8. The means for testing a backflow prevention device of claim 5 is a means for detecting fluid flow downstream of said means which allows fluid pressure from an inlet area to an interior space.

* * * * *